(12) United States Patent
Muramatsu et al.

(10) Patent No.: US 7,656,102 B2
(45) Date of Patent: Feb. 2, 2010

(54) DISCHARGE LAMP LIGHTING CIRCUIT

(75) Inventors: Takao Muramatsu, Shizuoka (JP);
Tomoyuki Ichikawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 336 days.

(21) Appl. No.: 11/840,311

(22) Filed: Aug. 17, 2007

(65) Prior Publication Data
US 2008/0048575 A1 Feb. 28, 2008

(30) Foreign Application Priority Data
Aug. 25, 2006 (JP) ............................. 2006-229518

(51) Int. Cl.
*G05F 1/00* (2006.01)
(52) U.S. Cl. ..................... 315/308; 315/291; 315/274; 315/247; 315/224
(58) Field of Classification Search .............. 315/224, 315/225, 246, 247, 274–281, 291, 294, 297, 315/299–302, 307, 308
See application file for complete search history.

(56) References Cited

U.S. PATENT DOCUMENTS 7,291,990 B2 * 11/2007 Ichikawa et al. ............ 315/291

FOREIGN PATENT DOCUMENTS

JP 2005-63821 3/2005

* cited by examiner

*Primary Examiner*—Tuyet Vo
(74) *Attorney, Agent, or Firm*—Fish & Richardson P.C.

(57) ABSTRACT

A discharge lamp lighting circuit includes a power supplying portion having a series resonant circuit containing transistors and a bridge driver, and a control portion for generating a control signal $Sc_1$ to control a driving frequency of the bridge driver. The control portion has a sample hold portion for generating a constant control signal S1, a frequency follow-up control portion for generating a control signal S2 in such a manner that a phase difference between a voltage and a current in the series resonant circuit is approximately zero, and a power control portion for generating a control signal S3 in such a manner that a magnitude of an AC power approximates a steady value. The control signal S1 is selected from a time $t_3$ to a time $t_4$, the control signal S2 is selected from the time $t_4$ to a time $t_5$, and the control signal S3 sent from the power control portion 13 is selected as the control signal $Sc_1$ after the time $t_5$.

3 Claims, 16 Drawing Sheets

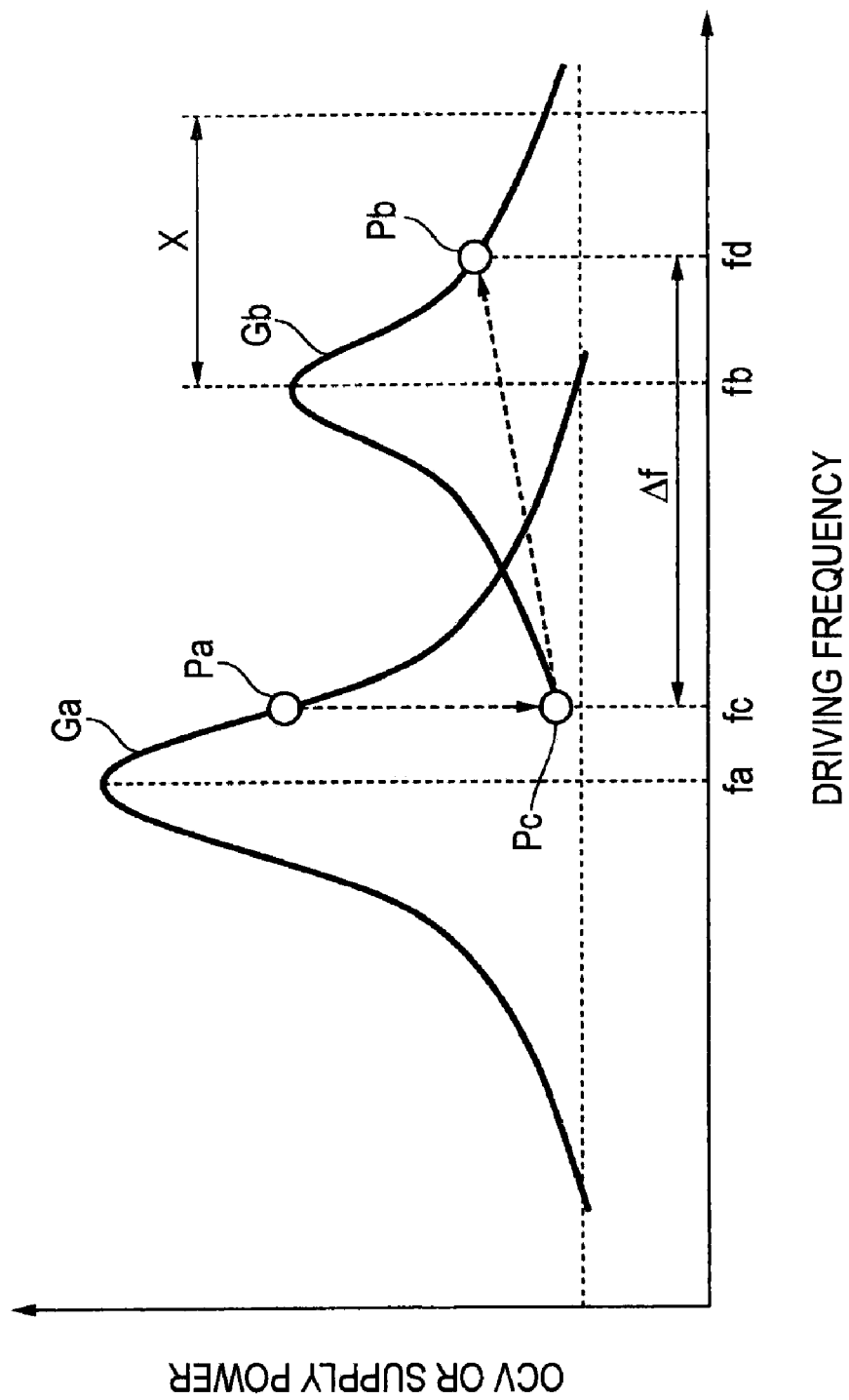

DISCHARGE LAMP LIGHTING CIRCUIT

TECHNICAL FIELD

The present disclosure relates to a discharge lamp lighting circuit.

BACKGROUND

A lighting circuit (ballast) for supplying power in a stable manner is used for turning ON a discharge lamp such as a metal halide lamp to be used in a headlamp for a vehicle. For example, a discharge lamp lighting circuit disclosed in Japanese Patent Document JP-A-2005-63821 comprises a DC/AC converting circuit including a series resonant circuit, and an AC power is supplied from the DC/AC converting circuit to a discharge lamp. The magnitude of a supply power is controlled by changing a driving frequency of the series resonant circuit.

Moreover, the discharge lamp lighting circuit also controls turning ON the discharge lamp. More specifically, the discharge lamp lighting circuit controls a no-load output voltage (OCV: Open Circuit Voltage) before turning ON the discharge lamp and applies a high voltage pulse to the discharge lamp to turn ON the discharge lamp, and then carries out a transition to a stationary lighting state while reducing a transient input power.

FIG. 16 is a graph showing a conceptual relationship between the driving frequency of the series resonant circuit and the magnitude of the supply power (or OCV). In FIG. 16, a graph Ga shows a relationship between the driving frequency and OCV before a lighting operation and a graph Gb shows a relationship between the driving frequency and the supply power after the lighting operation. As shown in FIG. 16, the magnitude of the supply power (or OCV) to the discharge lamp has a maximum value when the driving frequency is equal to a series resonant frequency (before the lighting operation: fa; after the lighting operation: fb), and is decreased when the driving frequency becomes greater (or smaller) than the series resonant frequency. In a region in which the driving frequency is lower than the series resonant frequency, a switching loss is increased so that a power efficiency is reduced. The magnitude of the driving frequency is controlled in a region in which the driving frequency is higher than the series resonant frequency.

In controlling lighting of the discharge lamp, an operating point before the lighting operation is set to a point Pa corresponding to a driving frequency fc higher than the series resonant frequency fa and an operating point after the lighting operation is set in a region X which is higher than the series resonant frequency fb. In a conventional discharge lamp lighting circuit, a transition from the point Pa to the region X is carried out in the following manner, for example. More specifically, after the discharge lamp is turned ON at the operating point Pa, the driving frequency fc before the lighting operation is maintained for a certain time. At this time, a correlation between the driving frequency and the supply power is changed to the graph Gb. Therefore, a transition of the operating point to a point Pc is carried out. Then, the driving frequency is changed by a predetermined variation $\Delta f$ (=fd−fc) to carry out a transition of the operating point to the point Pb in the region X.

However, it is difficult to set the frequency variation $\Delta f$ in view of a fluctuation in a source voltage, a variation in an operating temperature and an error of an electrical characteristic of an electronic component. The characteristic of an electronic component to be used in the discharge lamp lighting circuit has a variation and a difference between the resonant frequencies before and after the lighting operation (fb−fa) is varied. In order to preset $\Delta f$, accordingly, it is necessary to design a component with a margin or to regulate $\Delta f$ for every individual part. When the design of the component is designed to have the margin, however, an overspec is generated, which is undesirable. Even if $\Delta f$ is regulated for every individual part, moreover, there is a possibility that a lighting characteristic might be deteriorated with the initial $\Delta f$ when a characteristic of a circuit is changed due to aging deterioration.

SUMMARY

In view of the foregoing problems, to the present disclosure provides a discharge lamp lighting circuit capable of causing the design of a component to have a large margin and maintaining an excellent lighting property in the lighting control of a discharge lamp.

To address the foregoing problems, the disclosure provides a lighting circuit for supplying, to a discharge lamp, an AC power to turn ON the discharge lamp. The lighting circuit comprises a power supplying portion having a series resonant circuit including a plurality of switching units, at least one of an inductor and a transformer, and a capacitor, and a driving portion for driving the switching units and serving to convert a DC power and to supply the AC power to the discharge lamp, a control portion for generating a control signal to control a driving frequency of the driving portion, and a starting portion for applying a high voltage pulse to the discharge lamp, thereby promoting lighting. The control portion has a first circuit portion for generating a constant control signal, a second circuit portion for generating a control signal in such a manner that a phase difference between a voltage and a current in the series resonant circuit is approximately zero, and a third circuit portion for generating a control signal in such a manner that a magnitude of the AC power is approximately a steady value in accordance with a predetermined time function. The control signal sent from the first circuit portion is selected after a first time that the high voltage pulse is applied, the control signal sent from the third circuit portion is selected after a third time that a driving frequency based on the control signal which is sent from the third circuit portion exceeds a driving frequency based on the control signal which is sent from the second circuit portion, and the control signal sent from the second circuit portion is selected during a period from a second time between the first time and the third time to the third time.

The inventors supposed that the high voltage pulse is applied to turn ON the discharge lamp and a discharge is then carried out continuously while sufficient power is supplied to the discharge lamp during lighting control. Consequently, they found that the series resonant frequency for giving a maximum value of a supply power does not carry out a transition to the frequency fb in FIG. 16 immediately after the lighting operation of the discharge lamp, but continuously carries out a transition to fb from a low frequency side (in other words, a correlation graph Gb between the driving frequency and the supply power after the lighting operation is continuously moved from the low frequency side).

Some implementations include one or more of the following features. In the discharge lamp lighting circuit, the second circuit portion can generate the control signal in such a manner that the phase difference between the voltage and the current in the series resonant circuit is approximately zero. By using the control signal it is possible to cause the driving frequency of the driving portion to follow the series resonant frequency of the series resonant circuit. Therefore, it is possible to continuously supply, to the discharge lamp, a power having a magnitude close to a maximum power value as it changes every moment from the second time to the third time.

The control signal from the first circuit portion can be selected before the second time after the first time that the high voltage pulse is applied. Thus, the driving frequency is held to a certain value in response to the control signal from the first circuit portion before the operation of the second circuit portion can be carried out. Consequently, it is possible to grow an arc of the discharge lamp. After a timing (the third time) in which the driving frequency based on the control signal from the third circuit portion exceeds the driving frequency based on the control signal from the second circuit portion, the control signal from the third circuit portion is selected. Consequently, it is possible to carry out a transition from a lighting control mode to a power control mode in which the magnitude of the AC power approximates a steady value in accordance with a predetermined time function.

The driving frequency can be controlled following a change in the series resonant frequency for giving the maximum value of the supply power after the discharge lamp is turned ON. Therefore, it is not necessary to preset Δf as shown in FIG. 16, and it is possible to control the driving frequency without depending on a fluctuation in a source voltage, a variation in an operating temperature and an error of an electrical characteristic of an electronic component. It is, thus, possible to maintain an excellent lighting characteristic while reducing a margin of the designed component.

In lighting control for the discharge lamp, the lighting characteristic (e.g., a lighting success ratio) typically is important. The reason is as follows. When the lighting characteristic is excellent, it is not necessary to repeat the lighting control many times and it is possible to advance the start of the lighting operation. In particular, when the discharge lamp is used in a vehicle headlamp, it is preferable that the start of the lighting operation should be carried out as early as possible. According to the disclosed discharge lamp lighting circuit, it is possible to apply the high voltage pulse to turn ON the discharge lamp and then carry out the discharge continuously while supplying sufficient power to the discharge lamp. Therefore, the lighting characteristic can be enhanced more greatly.

Furthermore, the second time can be at the same time as or at later than a time when a phase of the current of the series resonant circuit can be detected. For example, when a current (a lamp current) flowing to the discharge lamp is detected to detect the phase of the current of the series resonant circuit, it is impossible to detect the phase of the current of the series resonant circuit before the current starts to flow to the discharge lamp (that is, an arc is started to be formed between electrodes of the discharge lamp). Therefore, it is preferable to grow an arc while holding the driving frequency to a certain value by the first circuit portion until the time when the phase of the current of the series resonant circuit can be detected (that is, the second time) and to cause the driving frequency to follow the series resonant frequency by the second circuit portion after the arc is grown to some degree and the lamp current can be detected. Consequently, the discharge lamp lighting circuit can be operated in an improved manner.

The second circuit portion can have a phase difference detecting portion for providing a first signal based on the voltage of the series resonant circuit and a second signal based on the current of the series resonant circuit. The phase difference detecting portion generates a phase difference signal having a pulse width corresponding to a phase difference when a phase of the second signal is advanced or delayed with respect to the first signal, and the control portion changes the driving frequency based on the phase difference signal.

Some implementations include one or more of the following advantages. For example, in some cases it is possible to cause a design of a component to have a large margin and to maintain an excellent lighting characteristic.

BRIEF DESCRIPTION OF THE DRAWINGS

FIG. 16 is a graph conceptually showing a relationship between the driving frequency of the series resonant circuit and the magnitude of the supply power (or OCV).

DETAILED DESCRIPTION

Figure 1:
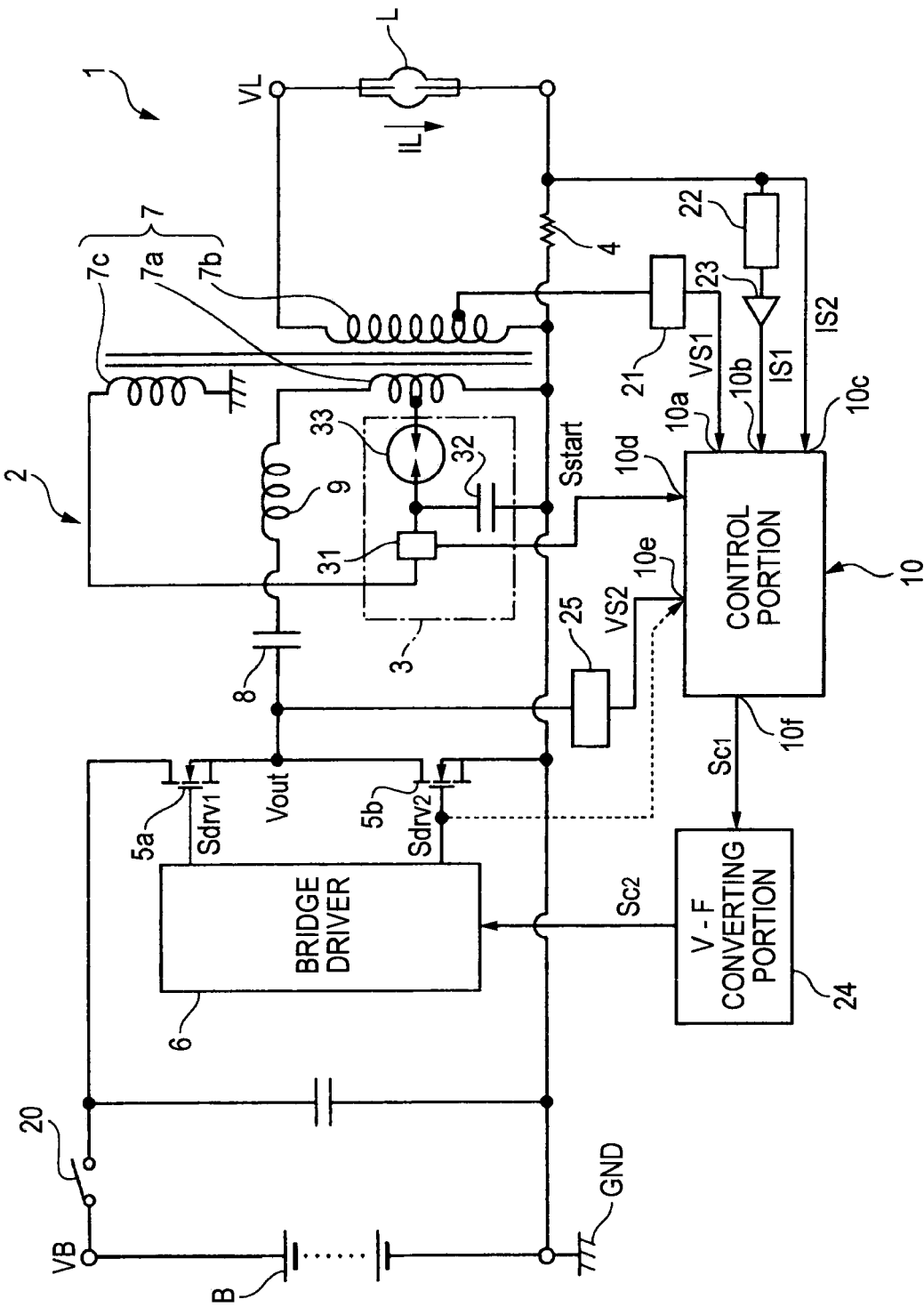
FIG. 1 is a block diagram showing a structure according to an embodiment of a discharge lamp lighting circuit according to the invention.

An embodiment of a discharge lamp lighting circuit according to the invention will be described below in detail with reference to the accompanying drawings. In the description of the drawings, the same elements have the same reference numerals and repetitive description will be omitted.

FIG. 1 is a block diagram showing an example of the structure of an embodiment of the discharge lamp lighting circuit according to the invention. The discharge lamp lighting circuit 1 shown in FIG. 1 serves to supply, to a discharge lamp L, an AC power for turning ON the discharge lamp L, and converts a DC voltage VB applied from a DC power supply B into an AC voltage and supplies the AC voltage to the discharge lamp L. The discharge lamp lighting circuit 1 is mainly used for a lighting device, particularly, a vehicle headlamp. A mercury free metal halide lamp is suitably used as the discharge lamp L, for example, although discharge lamps having other structures may be used as well.

In the illustrated implementation, the discharge lamp lighting circuit 1 comprises a power supplying portion 2 for supplying an AC power to the discharge lamp L upon receipt of a supply of a power from the DC power supply B, a control portion 10 for controlling a magnitude of the power supplied to the discharge lamp L based on an inter-electrode voltage (which will be hereinafter referred to as a lamp voltage) and an inter-electrode current (which will be hereinafter referred to as a lamp current) in the discharge lamp L, and a V-F converting portion 24 for carrying out a voltage-frequency conversion (V-F conversion) over a control signal $Sc_1$ to be an analog signal output from the control portion 10 to generate a control signal $Sc_2$.

The power supplying portion 2 supplies, to the discharge lamp L, a power having a magnitude based on the control signal $Sc_1$ sent from the control portion 10 (in the embodiment, the control signal $Sc_2$ sent from the V-F converting portion 24). The power supplying portion 2 is connected to the DC power supply B (such as a battery) through a switch 20 for a lighting operation and serves to carry out an AC conversion and raises a voltage upon receipt of the DC voltage VB from the DC power supply B. The power supplying portion 2 has a starting portion 3 for applying a high voltage pulse to the discharge lamp L to promote lighting at the start of the lighting operation, two transistors 5a and 5b as switching units, and a bridge driver 6 as a driving portion for driving the transistors 5a and 5b. Although an N channel MOSFET is used for the transistors 5a and 5b as shown in FIG. 1, other FETs and bipolar transistors may be used. In the illustrated embodiment, the transistor 5a has a drain terminal connected to a terminal on a positive side of the DC power supply B, a source terminal connected to a drain terminal of the transistor 5b, and a gate terminal connected to the bridge driver 6. Moreover, the transistor 5b has a source terminal connected to a ground potential line GND (that is, a terminal on a negative side of the DC power supply B) and a gate terminal connected to the bridge driver 6. The bridge driver 6 supplies driving signals $Sdrv_1$ and $Sdrv_2$, which have opposite phases to one other, to the gate terminals of the transistors 5a and 5b, thereby conducting the transistors 5a and 5b alternately.

The power supplying portion 2 has a transformer 7, a capacitor 8 and an inductor 9. The transformer 7 is provided for applying a high voltage pulse to the discharge lamp L and for transmitting a power and raising a voltage of the power. Moreover, the transformer 7, the capacitor 8 and the inductor 9 constitute a series resonant circuit. More specifically, a primary winding 7a of the transformer 7, the inductor 9 and the capacitor 8 are connected in series to each other. One end of the series circuit is connected to the source terminal of the transistor 5a and the drain terminal of the transistor 5b, and the other end is connected to the ground potential line GND. With this structure, a resonant frequency is determined by a synthetic reactance constituted by a leakage inductance of the primary winding 7a of the transformer 7 and an inductance of the inductor 9 and a capacity of the capacitor 8. In some cases, the series resonant circuit may be constituted by only the primary winding 7a, and the capacitor 8 and the inductor 9 may be omitted. Moreover, an inductance of the primary winding 7a may be set to be much smaller than that of the inductor 9, and the resonant frequency may be determined primarily by the inductor 9 and the capacity of the capacitor 8.

In the power supplying portion 2, a series resonance phenomenon caused by the capacitor 8 and inductive units (an inductance component and the inductor) is utilized to define the driving frequencies of the transistors 5a and 5b to be values which are equal to or greater than the series resonant frequency, thereby turning ON/OFF the transistors 5a and 5b alternately to generate an AC power on the primary winding 7a of the transformer 7. The AC power is boosted and transmitted to a secondary winding 7b of the transformer 7, and is supplied to the discharge lamp L connected to the secondary winding 7b. The bridge driver 6 for driving the transistors 5a and 5b reciprocally drives the transistors 5a and 5b so as to prevent both of the transistors 5a and 5b from being brought into a connecting state.

A series resonant frequency fa before turning ON the series resonant circuit and a series resonant frequency fb after the lighting operation are expressed in the following equations (1) and (2), respectively. In the equations, C represents the capacity of the capacitor 8, Lr represents the inductance of the inductor 9, Lp1 represents an inductance of the primary winding 7a before the lighting operation, and Lp2 represents an inductance of the primary winding 7a after the lighting operation.

[Equation 1]

$$fa = \frac{1}{2\pi\sqrt{C \cdot (Lr + Lp1)}} \quad (1)$$

[Equation 2]

$$fb = \frac{1}{2\pi\sqrt{C \cdot (Lr + Lp2)}} \quad (2)$$

In general, the values should be set so that Lp1>Lp2. Therefore, the series resonant frequency fa before the lighting operation is smaller than the series resonant frequency fb after the lighting operation.

Figure 2:
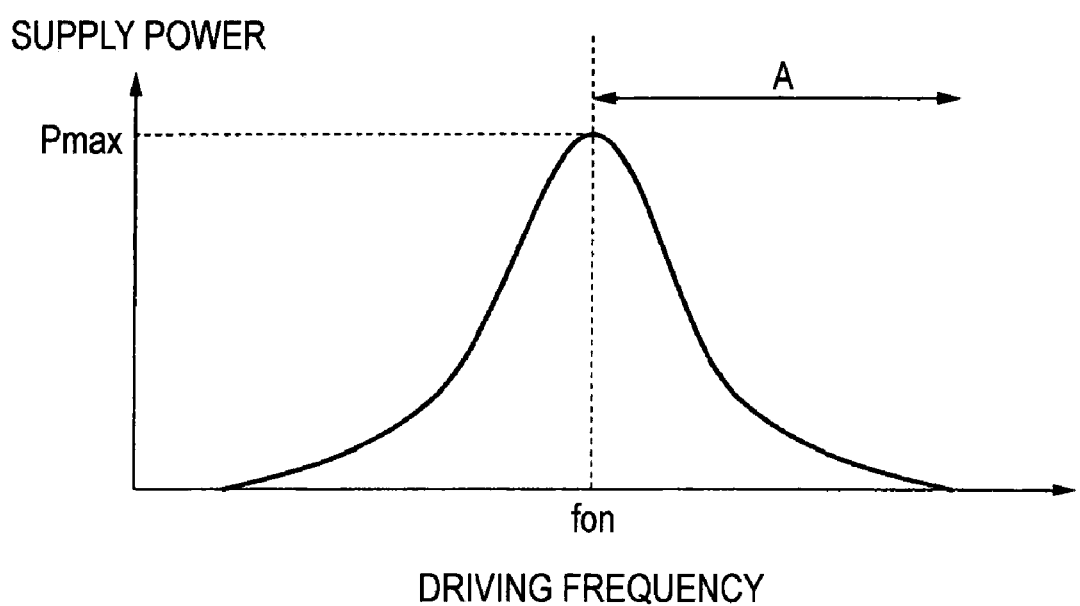
FIG. 2 is a graph conceptually showing a relationship between a driving frequency of a transistor and a magnitude of a supply power.

Moreover, an impedance of the series resonant circuit is changed depending on the driving frequencies of the transistors 5a and 5b through the bridge driver 6. Accordingly, it is possible to control the magnitude of the AC power supplied to the discharge lamp L by changing the driving frequencies. FIG. 2 is a graph showing a conceptual relationship between the driving frequencies of the transistors 5a and 5b and the magnitude of the supply power. As shown in FIG. 2, the magnitude of the power supplied to the discharge lamp L has a maximum value Pmax when the driving frequency is equal to the series resonant frequency fon and is decreased when the driving frequency becomes higher (or lower) than the series resonant frequency fon. When the driving frequency is lower than the series resonant frequency fon, a switching loss is increased so that power efficiency is reduced. Accordingly, the magnitude of the driving frequency of the bridge driver 6 is controlled in a region in which the driving frequency is higher than the series resonant frequency fon (region A in the drawing). A frequency region in which the driving frequency is lower than the series resonant frequency fon is referred to as a capacitive region, and a frequency region in which the driving frequency is higher than the series resonant frequency fon is referred to as an inductive region. In the illustrated embodiment, the driving frequency of the bridge driver 6 is controlled in accordance with a pulse frequency of the control signal $Sc_2$ (a signal including a pulse train having a frequency modulated) which is sent from the V-F converting portion 24 connected to the bridge driver 6.

The starting portion 3 is a circuit for applying a high voltage pulse for starting the discharge lamp L. When a trigger voltage and current is applied from the starting portion 3 to the transformer 7, the high voltage pulse is superposed on an AC voltage generated in the secondary winding 7b of the transformer 7. The starting portion 3 has a pulse applying signal generating circuit 31 for generating a pulse applying signal Start indicative of a timing for applying the high voltage pulse, a starting capacitor (a capacitive unit) 32 for storing a power to generate the high voltage pulse, and a switching unit 33 of a self-breakdown type such as a spark gap or a gas arrester. One end of the pulse applying signal generating circuit 31 is connected to an end of an auxiliary winding 7c of the transformer 7 and an input voltage to the starting portion 3 is provided. The other end of the pulse applying signal generating circuit 31 is connected to an end of the starting capacitor 32. Both of the other ends of the auxiliary winding 7c and the starting capacitor 32 are connected to the ground potential line GND. The input voltage to the starting portion 3 may be obtained from the secondary winding 7b of the transformer 7 or an auxiliary winding constituting a transformer together with the inductor 9 may be provided to obtain the input voltage therefrom, for example.

One end of the switching unit 33 of the self-breakdown type is connected to one end of the starting capacitor 32, and the other end of the switching unit 33 of the self-breakdown type is connected to the middle of the primary winding 7a. In the starting portion 3, when a voltage Vcd on both ends of the starting capacitor 32 reaches a discharge starting voltage of the switching unit 33 of the self-breakdown type, the switching unit 33 of the self-breakdown type is instantaneously brought into a conducting state so that the trigger voltage and current is output. Moreover, the pulse applying signal generating circuit 31 generates the pulse applying signal Sstart the moment that the voltage Vcd on both ends of the starting capacitor 32 is dropped by a discharge, and provides the pulse applying signal Sstart to the control portion 10 which will be described below.

The control portion 10 controls the driving frequency of the bridge driver 6 (that is, the magnitude of the power supplied to the discharge lamp L) based on a lamp voltage VL and a lamp current IL of the discharge lamp L. The control portion 10 has input terminals 10a to 10e and an output terminal 10f. The input terminal 10a is connected to an intermediate tap of the secondary winding 7b through a peak hold circuit 21 in order to input a signal (hereinafter referred to as a lamp voltage equivalent signal) VS1 indicative of an amplitude of the lamp voltage VL of the discharge lamp L. The lamp voltage equivalent signal VS1 is set to be 0.35 time as great as a peak value of the lamp voltage VL, for example. The input terminal 10b is connected to one end of a resistive unit 4 provided for detecting the lamp current IL of the discharge lamp L through a peak hold circuit 22 and a buffer 23. The end of the resistive unit 4 is further connected to one of the electrodes of the discharge lamp L through an output terminal of the discharge lamp lighting circuit 1, and the other end of the resistive unit 4 is connected to the ground potential line GND. A signal (hereinafter referred to as a lamp current equivalent signal) IS1 indicative of an amplitude of the lamp current IL is output from the buffer 23.

The input terminal 10c is connected to the end of the resistive unit 4. A signal IS2 indicative of the lamp current IL is input to the input terminal 10c in order to detect a phase of a current of the series resonant circuit. Usually, the current of the series resonant circuit (that is, the current of the primary winding 7a of the transformer 7) is larger than the lamp current (that is, the current of the secondary winding 7b). When a resistor for detecting a current is placed in the series resonant circuit, the power loss is increased. From these reasons, the control portion 10 according to the embodiment detects the phase of the current of the series resonant circuit by using the signal IS2 indicative of the lamp current IL in phase with the current of the series resonant circuit.

The input terminal 10d is connected to the starting portion 3. The pulse applying signal Sstart is input to the input terminal 10d. The starting portion 3 outputs the pulse applying signal Sstart to the control portion 10 in a timing in which the voltage on both ends of the starting capacitor 32 reaches a predetermined voltage so that the switching unit 33 of the self-breakdown type is turned ON, for example. Moreover, the input terminal 10e is connected to a wiring on the series resonant circuit of the power supplying portion 2 through a waveform shaping circuit 25. An output voltage Vout of the series resonant circuit has a rectangular wave generated by the waveform shaping circuit 25 (a signal VS2) to detect the phase of the voltage of the series resonant circuit and is input to the input terminal 10e. The input terminal 10e may be connected to a node of the bridge driver 6 and the gate terminal of the transistor 5b (or 5a) as shown in a broken line of the drawing, for example. In this case, the driving signal $Sdrv_2$ ($Sdrv_1$) is input to the input terminal 10e. The input terminal 10e may be connected to any portion of the discharge lamp lighting circuit 1 in which the phase of the voltage of the series resonant circuit can be detected.

Figure 3:
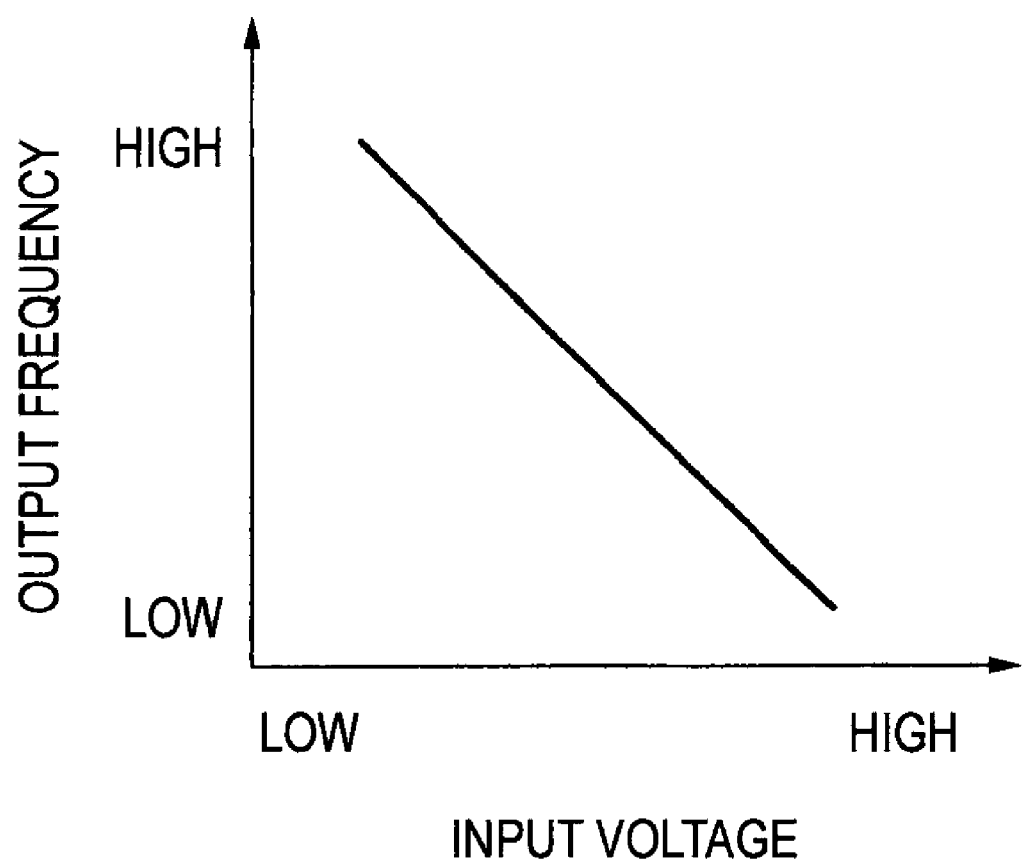
FIG. 3 is a graph schematically showing a converting characteristic of a V-F converting portion.

The V-F converting circuit 24 provides the control signal $Sc_1$ as an analog signal through the output terminal 10f of the control portion 10 and carries out a V-F conversion over the control signal $Sc_1$ to generate the control signal $Sc_2$. FIG. 3 schematically shows a converting characteristic of the V-F converting portion 24 according to the embodiment. The V-F converting portion 24 has a structure such that a pulse frequency of the control signal $Sc_2$ is increased when an input voltage (that is, a voltage of the control signal $Sc_1$) is reduced.

Figure 4:
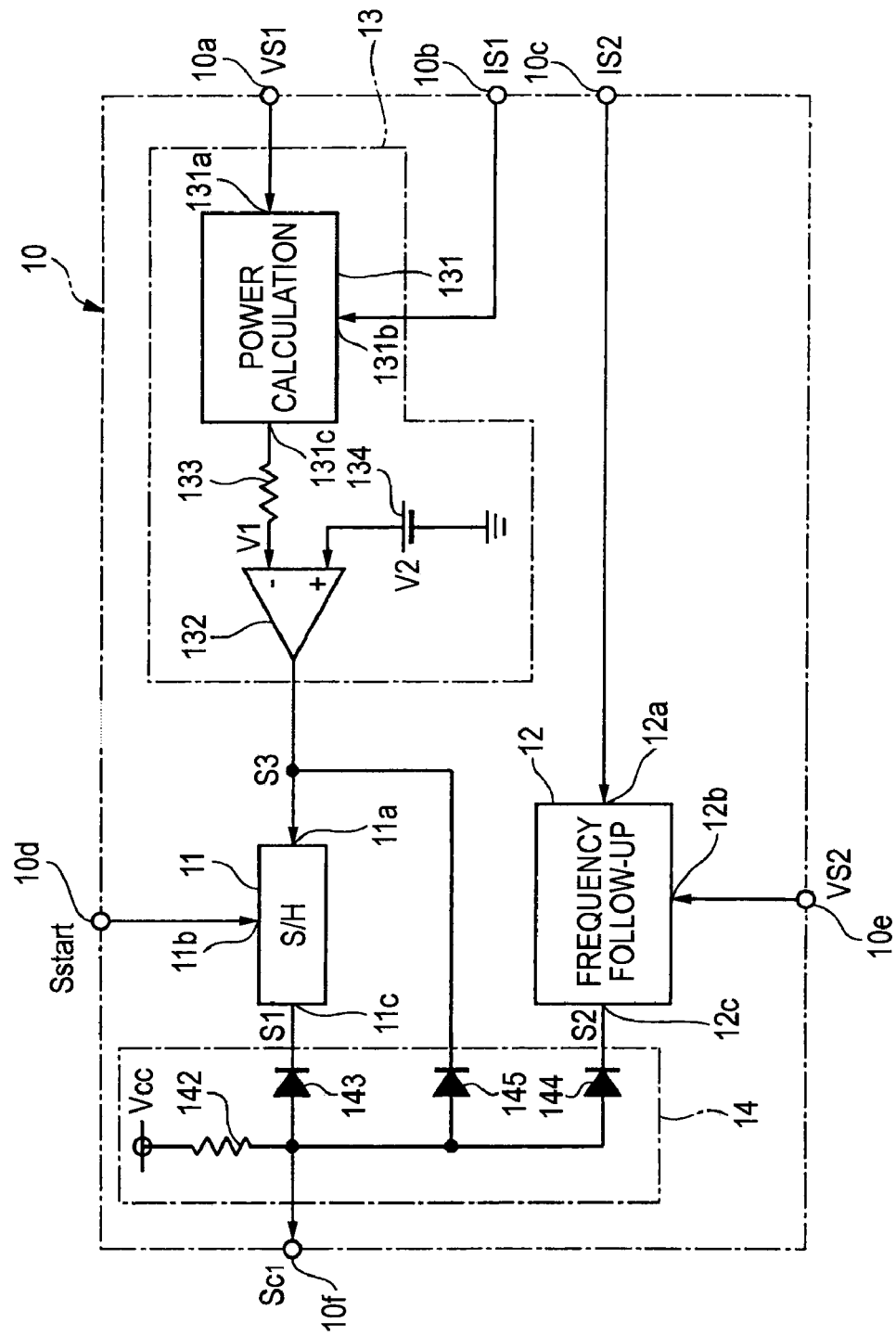
FIG. 4 is a block diagram showing an example of an internal structure of a control portion.

Next, a description will be given to an internal structure of the control portion 10 according to the illustrated embodiment. FIG. 4 is a block diagram showing an example of the internal structure of the control portion 10. As shown in FIG. 4, the control portion 10 has a sample hold portion 11 for generating a control signal S1, a frequency follow-up control portion 12 for generating a control signal S2, a power control portion 13 for generating a control signal S3, and a selecting portion 14 for selecting and outputting any of the control signals S1 to S3. The selecting portion 14 selects any of the control signals S1 to S3 which has the lowest voltage and outputs the same signal as the control signal $Sc_1$ to the V-F converting portion 24 (see FIG. 1). As described above, in the V-F converting portion 24, the pulse frequency of the control signal $Sc_2$ is increased (that is, the driving frequency of the series resonant circuit is increased) when the voltage of the control signal $Sc_1$ is reduced. Therefore, the selecting portion 14 selects any of the control signals S1 to S3 which has the highest driving frequency of the series resonant circuit.

The sample hold portion 11 is a first circuit portion according to the embodiment and serves to generate the control signal S1 having a certain voltage. The sample hold portion 11 has input terminals 11a and 11b and an output terminal 11c. The signal (the control signal S3) from the power control portion 13 is provided to the input terminal 11a. The pulse applying signal Sstart is provided to the input terminal 1b through the input terminal 10d of the control portion 10. The sample hold portion 11 holds a voltage value of the control signal S3 by using the pulse applying signal Sstart as a trigger, sets the held voltage value as the control signal S1 and generates the control signal S1 from the output terminal 11c to the selecting portion 14.

The frequency follow-up control portion 12 is a second circuit portion according to the embodiment and serves to generate the control signal S2 for causing the phase difference between the voltage and the current in the series resonant circuit of the power supplying portion 2 to be approximately zero. The frequency follow-up control portion 12 has input terminals 12a and 12b and an output terminal 12c. The signal IS2 is provided to the input terminal 12a through the input terminal 10c of the control portion 10. The signal VS2 is provided to the input terminal 12b through the input terminal 10e of the control portion 10. The frequency follow-up control portion 12 generates the control signal S2 in such a manner that the phase difference between the phase of the current of the series resonant circuit which is detected based on the signal IS2 and the phase of the voltage of the series resonant circuit which is detected based on the signal VS2 is approximately zero and generates the control signal S2 to the selecting portion 14.

The power control portion 13 is a third circuit portion according to the embodiment. The power control portion 13 generates the control signal S3 in such a manner that the magnitude of OCV to be supplied to the discharge lamp L is approximately a predetermined value before the discharge lamp L is turned ON. Moreover, the power control portion 13 generates the control signal S3 in such a manner that the magnitude of the power to be supplied to the discharge lamp L is approximately a steady value in accordance with a predetermined time function after the discharge lamp L is turned ON.

Figure 5:
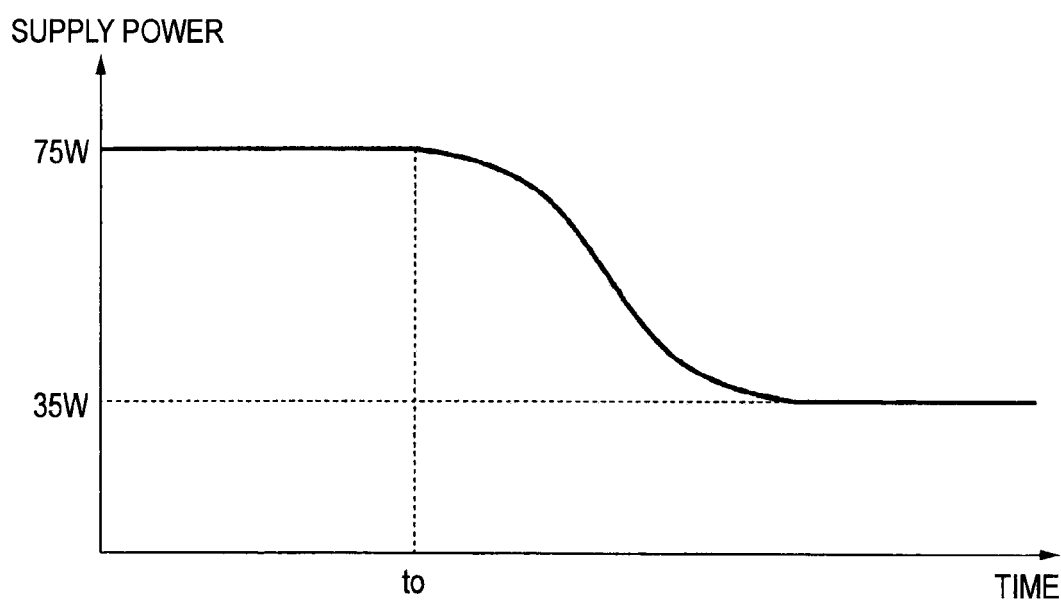
FIG. 5 is a graph showing a typical example of a predetermined time function.

FIG. 5 is a graph showing a typical example of the predetermined time function. In FIG. 5, the ordinates axis indicates a magnitude of a supply power and the abscissas axis indicates an elapsed time. The power control portion 13 generates the control signal S3 in such a manner that the magnitude of the supply power has an initial value (for example, 75 W) and gradually approximates a steady value (for example, 35 W) from the initial value after a time t0 in accordance with the predetermined time function shown in FIG. 5, for example.

As shown in FIG. 4, the power control portion 13 according to the illustrated embodiment includes a power calculating portion 131 and an error amplifier 132. The power calculating portion 131 has an input terminal 131a for providing the lamp voltage equivalent signal VS1 through the input terminal 10a of the control portion 10 and an input terminal 131b for providing the lamp current equivalent signal IS1 through the input terminal 10b of the control portion 10. The power calculating portion 131 generates an output voltage V1 in such a manner that the lamp voltage equivalent signal VS1 indicative of the magnitude of OCV approximates a predetermined value before the discharge lamp L is turned ON, and generates the output voltage V1 in such a manner that the magnitude of the supply power approximates a steady value in accordance with the predetermined time function (see FIG. 5) based on the lamp voltage equivalent signal VS1 and the lamp current equivalent signal IS1 after the discharge lamp L is turned ON. The output voltage V1 is provided from an output terminal 131c of the power calculating portion 131 to an inverting input terminal of the error amplifier 132 through a resistor 133. A non-inverting input terminal of the error amplifier 132 is connected to a voltage source 134 for generating a predetermined reference voltage V2. A voltage output from the error amplifier 132 is provided as the control signal S3 to the sample hold portion 11 and the selecting portion 14.

The selecting portion 14 has diodes 143 to 145. The diodes 143 to 145 constitute a diode OR circuit. More specifically, a cathode of the diode 143 is connected to the output terminal 11c of the sample hold portion 11, a cathode of the diode 144 is connected to the output terminal 12c of the frequency follow-up control portion 12, and a cathode of the diode 145 is connected to the output terminal of the power control portion 13 (the output terminal of the error amplifier 132). Moreover, anodes of the diodes 143 to 145 are short-circuited with each other and are connected to a power potential line Vcc through a resistor 142, and are connected to the V-F converting portion 24 through the output terminal 10f of the control portion 10. Accordingly, any of the voltages of the control signals S1 to S3 which is the lowest acts as a voltage of a node 141 and the same voltage is output as the control signal $Sc_1$.

Figure 6:
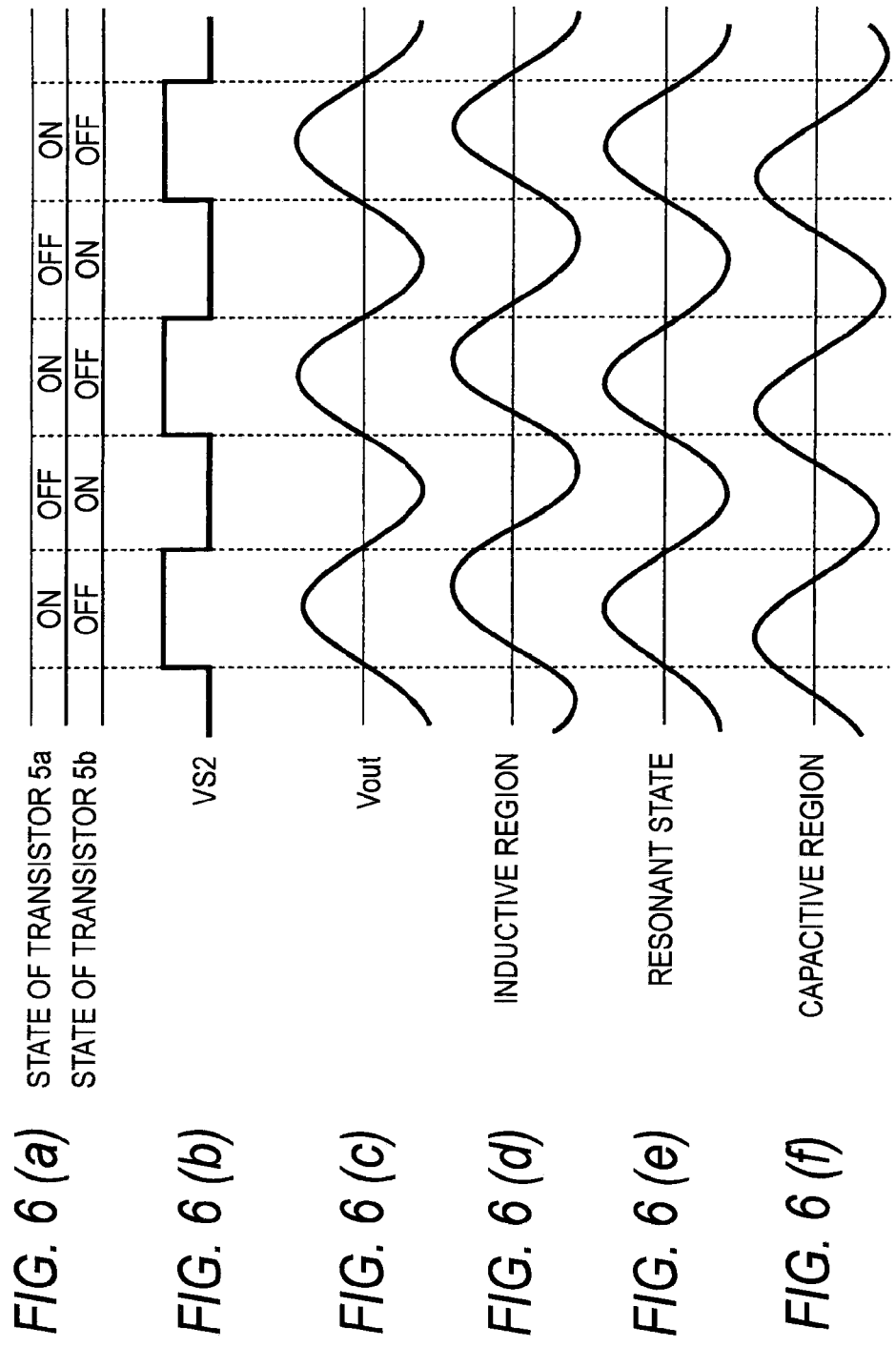
FIG. 6 is a graph illustrating a temporal change in each of (a) an ON/OFF state of a transistor, (b) a waveform of a signal VS2, (c) a waveform of a voltage of a series resonant circuit, (d) a current waveform in an inductive region of the series resonant circuit, (e) a current waveform in a resonant state of the series resonant circuit, and (f) a current waveform in a capacitive region of the series resonant circuit, illustrating their phase relationship.

The function of the frequency follow-up control portion 12 will be further described in detail. FIG. 6 is a graph illustrating a temporal change in each of (a) ON/OFF states of the transistors 5a and 5b, (b) a waveform of the signal VS2, (c) a waveform of a voltage (an output voltage Vout) of the series resonant circuit, (d) a current waveform in the inductive region of the series resonant circuit, (e) a current waveform in a resonant state of the series resonant circuit, and (f) a current waveform in the capacitive region of the series resonant circuit, representing their phase relationship. As shown in the drawings, the phase of the current of the series resonant circuit is delayed from that of the voltage in the inductive region, the phase of the current is coincident with that of the voltage in the resonant state, and the phase of the current is advanced more greatly than that of the voltage in the capacitive region.

The frequency follow-up control portion 12 can determine whether an operating state of the series resonant circuit is the capacitive region or not (that is, the phase of the current waveform is advanced with respect to the voltage waveform of the series resonant circuit or not) in the following manner. More specifically, in FIG. 6, when the current of the series resonant circuit is greater than zero the moment that the signal VS2 rises to an H level and the current of the series resonant circuit is smaller than zero when the signal VS2 has the H level, the phase of the current waveform is advanced with respect to the voltage waveform so that it can be decided that the operating state is the capacitive region. Also when the current of the series resonant circuit is smaller than zero the moment that the signal VS2 falls to an L level and the current of the series resonant circuit is larger than zero when the signal VS2 has the L level, alternatively, the phase of the current waveform is advanced with respect to the voltage waveform and it can be determined that the operating state is the capacitive region.

When it is determined that the operating state of the series resonant circuit is the capacitive region, the frequency follow-up control portion 12 reduces the voltage value of the control signal S2 and raises the driving frequency of the series resonant circuit, thereby causing the phase difference between the voltage and the current in the series resonant circuit to approximate to zero. On the other hand, when it is determined that the operating state of the series resonant circuit is not the capacitive region, the frequency follow-up control portion 12 increases the voltage value of the control signal S2 and reduces the driving frequency of the series resonant circuit, thereby causing the phase difference between the voltage and the current in the series resonant circuit to approximately zero. Thus, the frequency follow-up control portion 12 generates the control signal S2 in such a manner that the phase difference between the voltage and the current in the series resonant circuit is approximately zero, thereby causing the driving frequency of the series resonant circuit to follow the series resonant frequency fon. The structure and operation of the frequency follow-up control portion 12 will be described below in detail.

Figure 7:
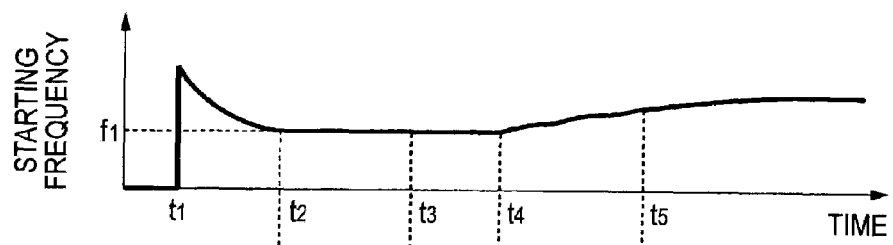
FIG. 7 is a graph showing a transition of each of (a) a driving frequency, (b) a starting capacitor voltage and (c) a lamp voltage VL, and FIG. 7($d$) shows a change of a control mode in a control portion.
Figure 7:
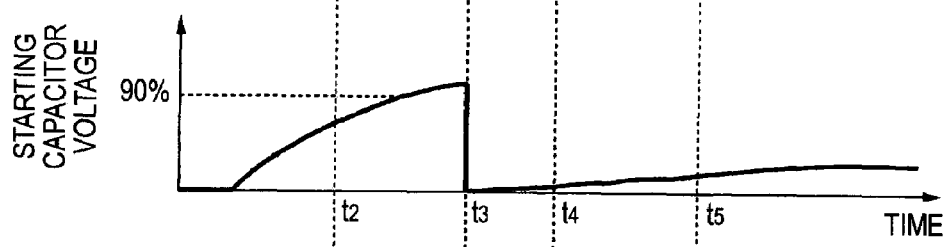
Figure 7:
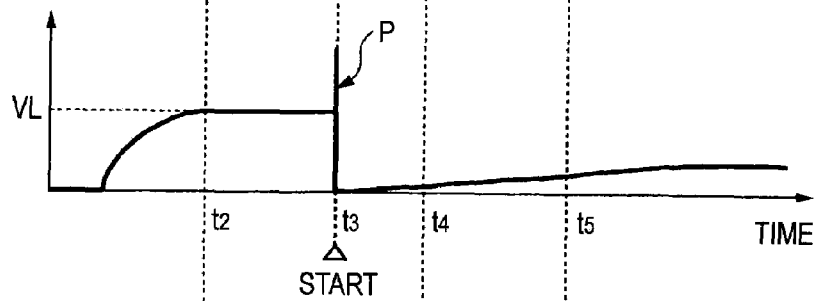
Figure 7:
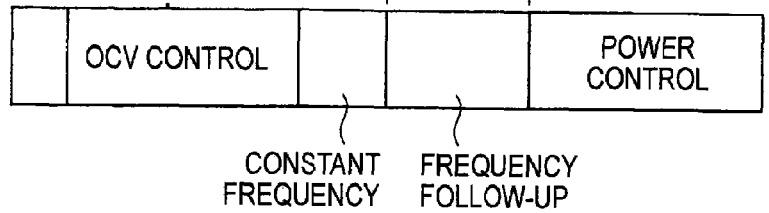
Figure 8:
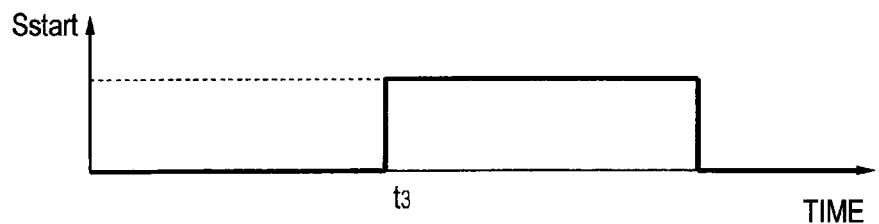
FIG. 8 is a graph showing a transition of (a) a pulse applying signal, (b) a control signal $Sc_1$, and (c) a supply power, and FIG. 8($d$) shows a transit of the control mode in the control portion.
Figure 8:
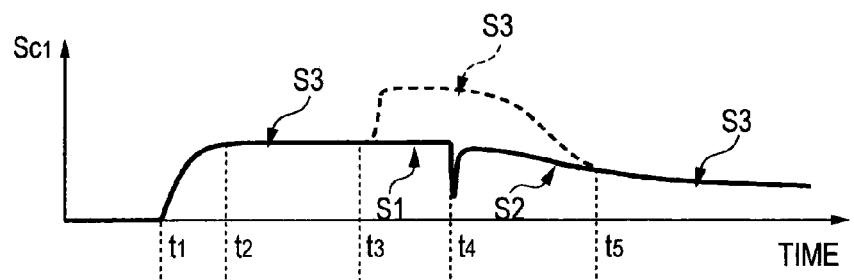
Figure 8:
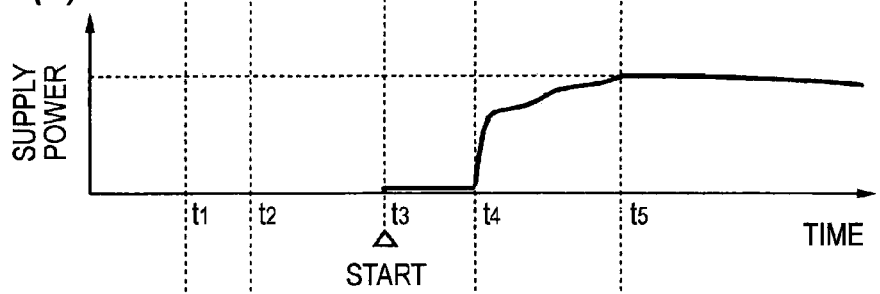
Figure 8:
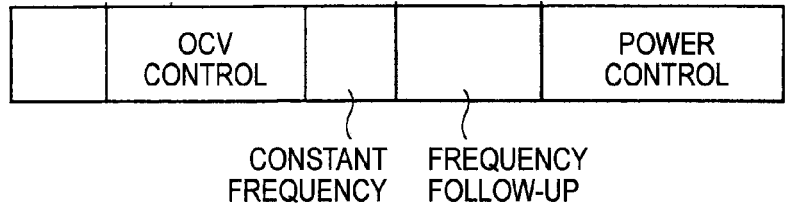
Figure 9:
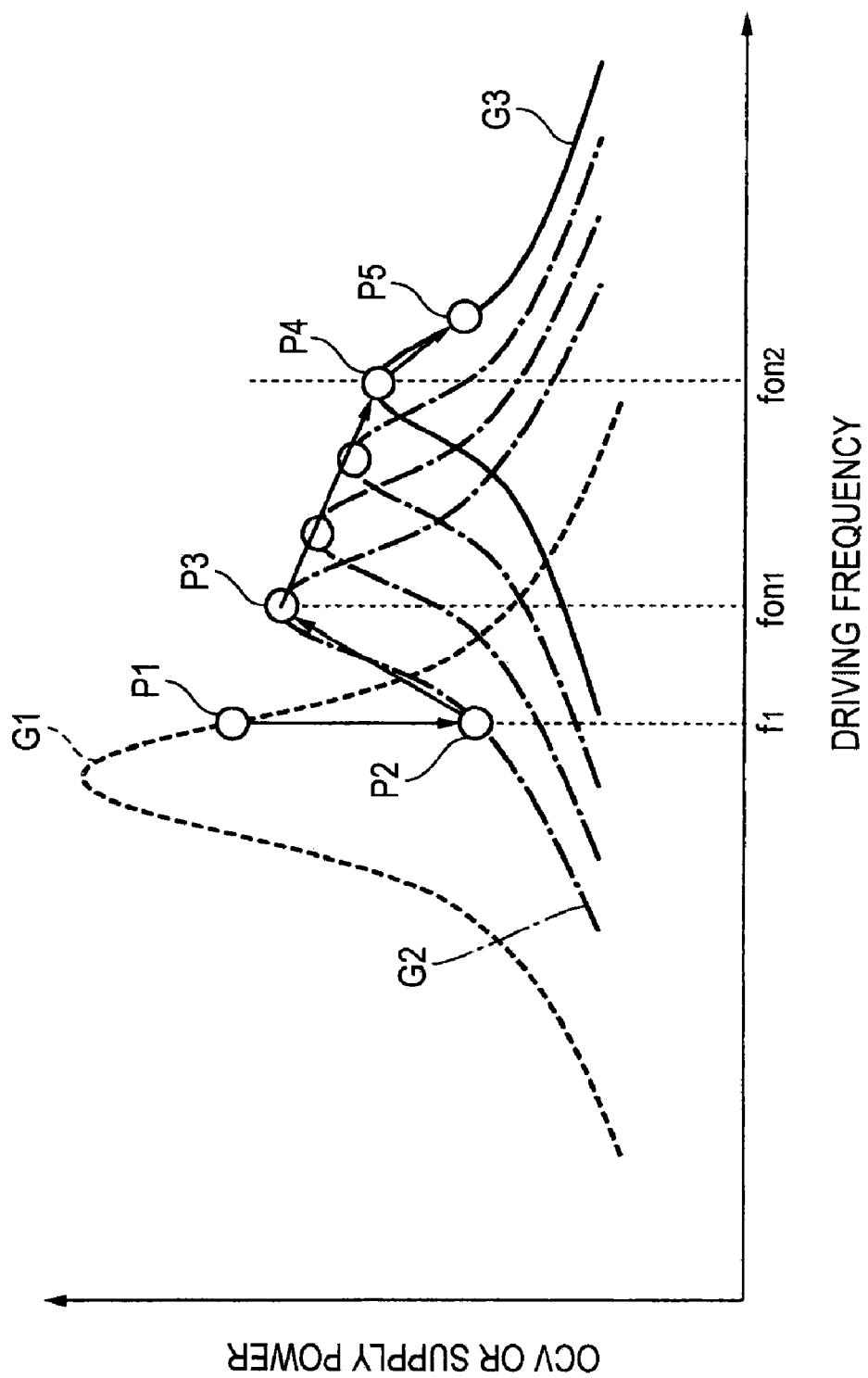
FIG. 9 is a graph showing a relationship between a driving frequency of a series resonant circuit and a magnitude of a supply power (or OCV), illustrating a correspondence relationship with the control mode in the control portion.

The operation of the discharge lamp lighting circuit 1 will be described with reference to FIGS. 7 to 9. FIG. 7 is a graph showing a transition of each of (a) a driving frequency, (b) a starting capacitor voltage and (c) a lamp voltage VL. Moreover, FIG. 8 is a graph showing a transition of each of (a) a pulse applying signal Sstart, (b) a control signal $Sc_1$ and (c) a supply power. FIGS. 7(d) and 8(d) show a change of a control mode in the control portion 10. FIG. 9 is a graph showing a relationship between the driving frequency of the series resonant circuit and the magnitude of the supply power (or OCV), illustrating a correspondence relationship with the control mode in the control portion 10.

When the discharge lamp lighting circuit 1 initially is turned ON (time $t_1$), the driving frequency rises to a maximum value as shown in FIG. 7(a). At this time, in the control portion 10, the control signal S3 sent from the power control portion 13 is selected and provided as the control signal $Sc_1$. The driving frequency is controlled in response to the control signal $Sc_1$ and is converged on a predetermined value $f_1$ at a time $t_2$ (OCV control mode). A relationship between the driving frequency of the series resonant circuit and the supply power before the lighting operation is shown in a graph G1 of FIG. 9, and predetermined OCV corresponding to an operating point P1 corresponding to the driving frequency $f_1$ is applied to the discharge lamp L. In the meantime, the starting capacitor of the starting portion 3 begins to be charged.

When the voltage on both ends of the starting capacitor 32 reaches a predetermined value so that the switching unit 32 of the self-breakdown type is turned ON (a time $t_3$ in FIG. 7(b)), subsequently a high voltage pulse P is applied to the discharge lamp L by the starting portion 3 as shown in FIG. 7(c). The time $t_3$ is a first time according to the embodiment. At this time, the electrodes of the discharge lamp L are activated by discharging. Therefore, the lamp voltage VL is reduced to the vicinity of 25 V. At this time, the pulse applying signal Sstart is output from the starting portion 3 to the control portion 10 (FIG. 8(a)). In the control portion 10, the sample hold portion 11 holds the control signal S3 sent from the power control portion 13 upon receipt of the pulse applying signal Sstart and outputs the value as the control signal S1 (a certain value).

At this time, as shown in FIG. 8(b), the control signal S3 output from the power control portion 13 in the control portion 10 is increased. For the control signal $Sc_1$ provided from the control portion 10, the control signal S1 is selected in the selecting portion 14. Therefore, the control signal $Sc_1$ is maintained at a certain value after the time $t_3$. Consequently, the driving frequency is maintained at a certain value $f_1$ as shown in FIG. 7(a) (a frequency constant control mode). On the other hand, a relationship between the driving frequency of the series resonant circuit and the supply power shown in FIG. 9 is changed to a graph G2. Accordingly, the operating point is changed from P1 to P2.

When the arc of the discharge lamp L is grown and the lamp current IL is gradually increased so that the signal IS2 can be detected (in other words, the phase of the current of the series resonant circuit can be detected) (a time $t_4$ in FIG. 8(b)), subsequently, the frequency follow-up control portion 12 of the control portion 10 starts to provide the control signal S2.

The time $t_4$ is a second time according to the embodiment. At this time, as shown in FIG. 9, a resonant frequency fon, of the series resonant circuit is higher than the frequency $f_1$ and the frequency follow-up control portion 12 provides the control signal S2 having a low voltage in order to cause the driving frequency to follow the resonant frequency $fon_1$. Therefore, the control signal S2 is selected in the selecting portion 14 after the time $t_4$ (a frequency follow-up mode).

When the discharge lamp L is turned ON, the resonant frequency of the series resonant circuit is changed from the low frequency $fon_1$ to a continuously high frequency $fon_2$ as shown in FIG. 9. In other words, the correlation graph G2 between the driving frequency and the supply power after the lighting operation is continuously moved from the low frequency side to a graph G3 on a high frequency side. In the frequency follow-up mode, the control signal $Sc_1$ from the control portion 10 is generated in such a manner that the driving frequency of the series resonant circuit follows the resonant frequency by the frequency follow-up control portion 12. As shown in FIG. 9, accordingly, the operating point is moved from P2 corresponding to the frequency $f_1$ to P3 corresponding to the frequency $fon_1$, and is then changed to P4 corresponding to the frequency $fon_2$ while following the series resonant frequency moved to the high frequency side.

In the meantime, the power control portion 13 continuously generates the control signal S3 in such a manner that the magnitude of the supply power to the discharge lamp L is changed in accordance with the time function shown in FIG. 5. After a time $t_5$ that the control signal S3 is smaller than the control signal S2 from the frequency follow-up control portion 12 (that is, after the driving frequency based on the control signal S3 exceeds the driving frequency based on the control signal S2), the control signal S3 is selected in the selecting portion 14 (a power control mode). The time $t_5$ is a third time according to the embodiment. Subsequently, the control signal $Sc_1$ is generated by the power control portion 13 in such a manner that the magnitude of the supply power to the discharge lamp L approximates a steady value, and the operating point is stabilized to a stationary point P5 in the inductive region as shown in FIG. 9.

A description will be given to specific structural examples and operations of the frequency follow-up control portion 12 and the sample hold portion 11 according to the illustrated embodiment.

Figure 10:
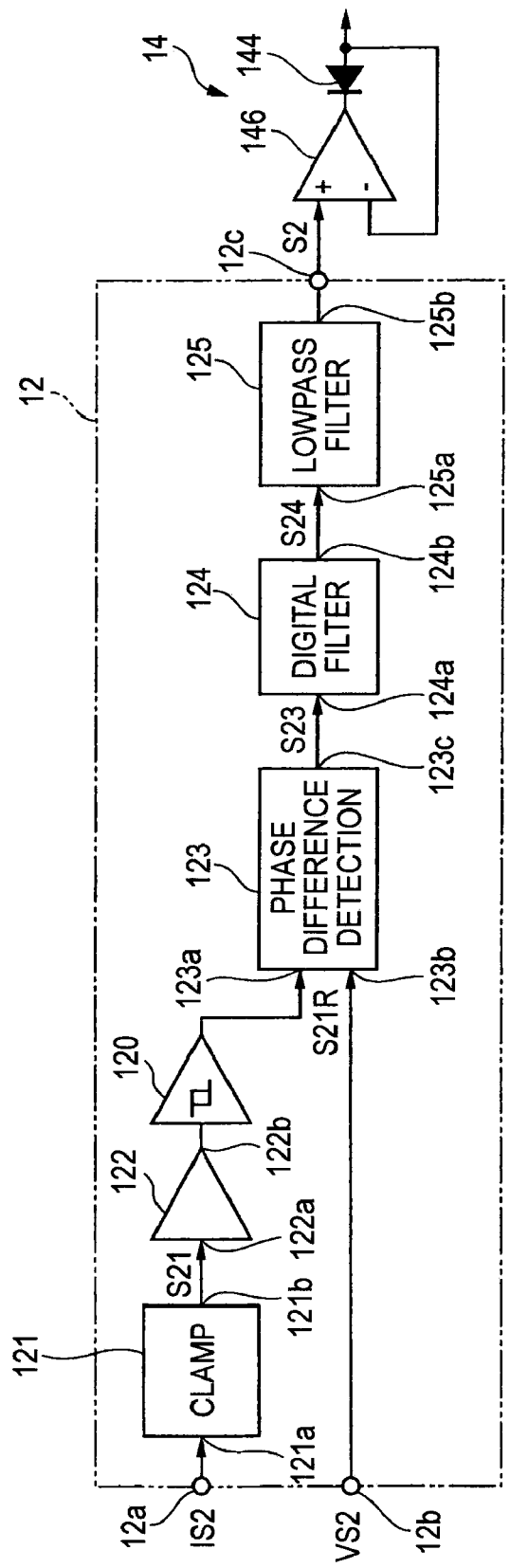
FIG. 10 is a block diagram showing an example of an internal structure of a frequency follow-up control portion.

FIG. 10 is a block diagram showing an example of an internal structure of the frequency follow-up control portion 12. As shown in FIG. 10, the frequency follow-up control portion 12 has a clamp portion 121, an amplifying portion 122, a hysteresis comparator 120, a phase difference detecting portion 123, a digital filter portion 124 and a lowpass filter portion 125.

An input terminal 121a of the clamp portion 121 is connected to the input terminal 10c of the control portion 10 (see FIG. 4) through the input terminal 12a of the frequency follow-up control portion 12, and the signal IS2 is input to the input terminal 121a. The clamp portion 121 clamps a sine wave-shaped signal IS2 corresponding to the waveform of the lamp current IL. Moreover, an input terminal 122a of the amplifying portion 122 is connected to an output terminal 121b of the clamp portion 121, and a signal S21 from the clamp portion 121 (the signal IS2 subjected to the clamping) is provided to the input terminal 122a. The amplifying portion 122 amplifies the signal S21 and provides the amplified signal S21 to the hysteresis comparator 120. The hysteresis comparator 120 carries out waveform shaping over the amplified signal S21 to generate a rectangular wave-shaped signal S21R. The hysteresis comparator 120 provides the signal S21R to the phase difference detecting portion 123. The signal S21R is a second signal based on the current of the series resonant circuit according to the embodiment.

An input terminal 123a of the phase difference detecting portion 123 is connected to an output terminal of the hysteresis comparator 120 and the signal S21R is provided to the input terminal 123a. Moreover, the signal VS2 is provided to an input terminal 123b of the phase difference detecting portion 123 through the input terminal 12b of the frequency follow-up control portion 12. The signal VS2 is a first signal based on the voltage of the series resonant circuit according to the embodiment. The phase difference detecting portion 123 generates a signal (a phase difference signal) S23 indicative of a phase difference between the signal S21R and the signal VS2.

An input terminal 124a of the digital filter portion 124 is connected to an output terminal 123c of the phase difference detecting portion 123, and the digital filter portion 124 generates a signal S24 indicating whether the operating state of the series resonant circuit is the capacitive region or not based on the signal S23 from the phase difference detecting portion 123. Moreover, an input terminal 125a of the lowpass filter portion 125 is connected to an output terminal 124b of the digital filter portion 124 and the lowpass filter portion 125 generates the control signal S2 based on the signal S24 from the digital filter portion 124. An output terminal 125b of the lowpass filter portion 125 is connected to the output terminal 12c of the frequency follow-up control portion 12 and the control signal S2 is povided to the selecting portion 14.

In the selecting portion 14, if an amplifier 146 is provided in a former stage of the diode 144 to constitute a sucking buffer circuit as shown in FIG. 10, a more stable operation can be carried out.

Figure 11:
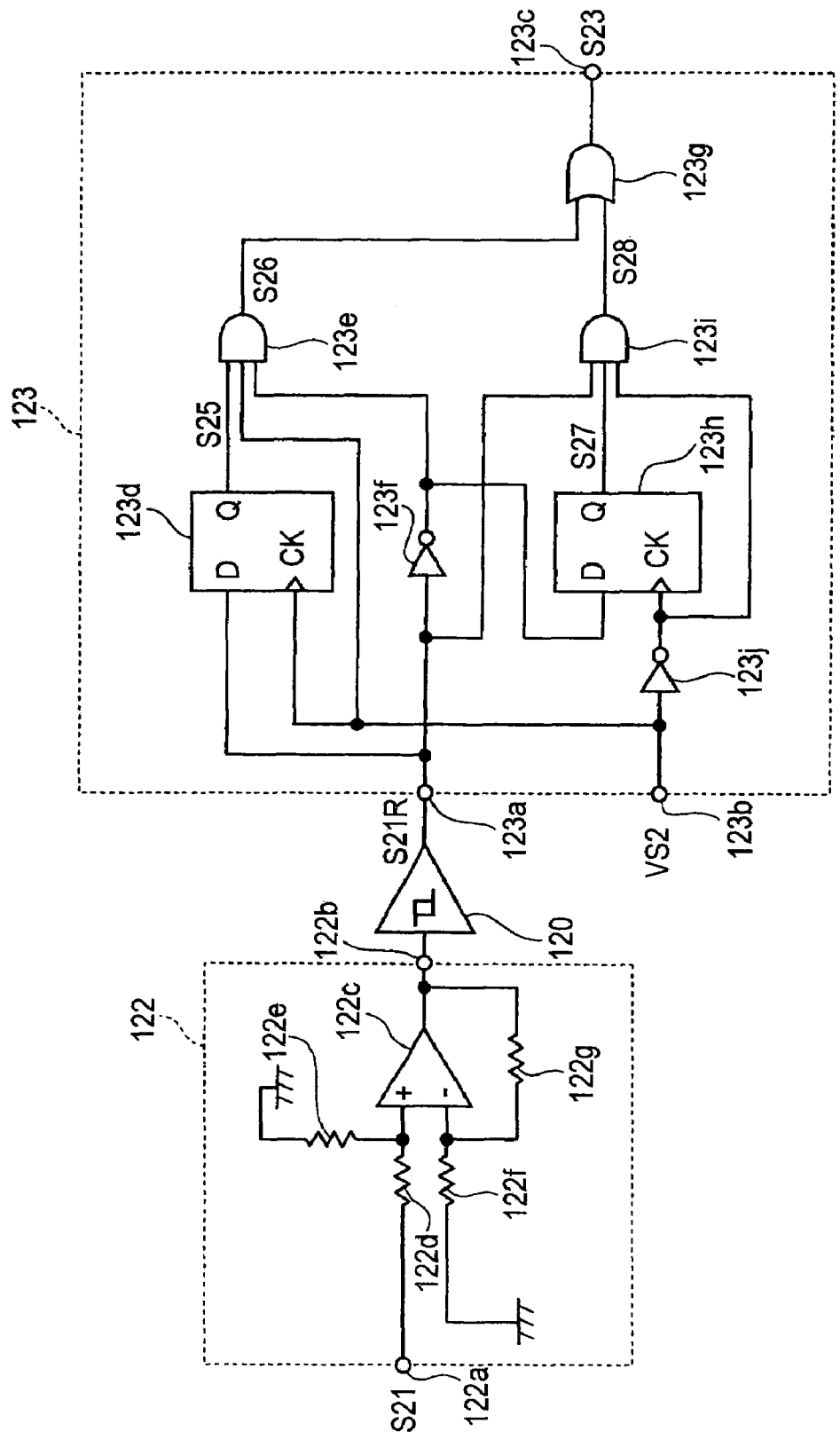
FIG. 11 is a circuit diagram showing a specific example of structures of an amplifying portion and a phase difference detecting portion.

FIG. 11 is a circuit diagram showing a specific example of structures of the amplifying portion 122 and the phase difference detecting portion 123. The amplifying portion 122 is composed of a differential amplifier circuit using an amplifier 122c, for example. More specifically, a non-inverting input terminal of the amplifier 122c is connected to the input terminal 122a through a resistor 122d, and furthermore, is connected to a ground potential through a resistor 122e. An inverting input terminal of the amplifier 122c is connected to the ground potential through a resistor 122f and a feedback resistor 122g is connected between the inverting input terminal and an output terminal. The output terminal of the amplifier 122c is connected to the output terminal 122b of the amplifying portion 122.

The phase difference detecting portion 123 has D flip-flops 123d and 123h, AND gates 123e and 123i, NOT gates 123f and 123j, and an OR gate 123g. The signal S21R obtained by shaping the signal IS2 into a rectangular wave is input to a D terminal of the D flip-flop 123d and the signal VS2 is provided to a clock (CK) terminal. Then, a Q output (a signal S25) of the D flip-flop 123d is provided to the AND gate 123e in a latter stage.

The signal VS2 and a signal obtained by inverting the signal S21R through the NOT gate 123f are provided to the AND gate 123e in addition to the signal S25 sent from the D flip-flop 123d. Then, a signal S26 indicative of AND of these signals is provided to the OR gate 123g in the latter stage.

A signal output from the NOT gate 123f (an inverted signal of the signal S21R) is supplied to a D terminal of the D flip-flop 123h, and the signal VS2 is inverted by the NOT gate 123j and an inverted signal thus obtained is provided to a clock (CK) terminal. Then, a Q output (a signal S27) of the D flip-flop 123h is provided to the AND gate 123i in the latter stage.

A signal output from the NOT gate 123j (an inverted signal of the signal VS2) and the signal S21R are provided to the AND gate 123j in addition to the signal S27 from the D flip-flop 123h. Then, a signal S28 indicative of AND of these signals is output to the OR gate 123g in the latter stage.

The OR gate 123g provides a signal indicative of OR of the signals S26 and S28. The signal from the OR gate 123g is provided as the signal S23 to the digital filter portion 124 (see FIG. 10).

Figure 12:
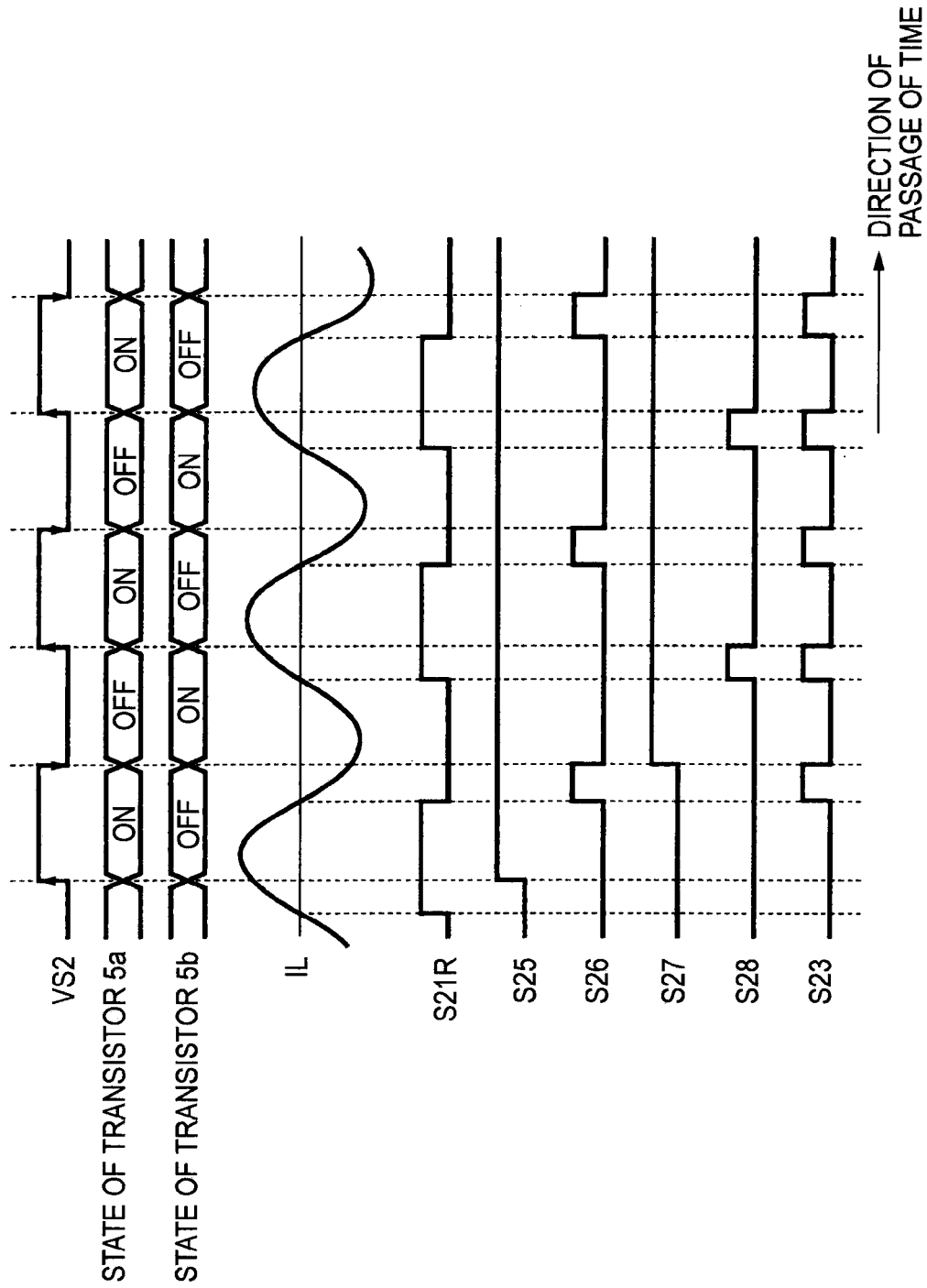
FIG. 12 is a timing chart showing each signal in the phase difference detecting portion.

FIG. 12 is a timing chart showing each signal in the phase difference detecting portion 123. An operation of the phase difference detecting portion 123 will be described with reference to FIGS. 11 and 12.

First, when the signal VS2 rises from an L level to an H level, a signal level of the signal S21R is latched in the D flip-flop 123d and the Q output (the signal S25) is output. When the signal S25 has the H level (that is, the lamp current IL is larger than zero the moment that the signal VS2 rises to have the H level) and the signal S21R has the L level when the signal VS2 has the H level (that is, the lamp current IL is smaller than zero when the signal VS2 has the H level), the signal S26 from the AND gate 123e has the H level.

When the signal VS2 falls from the H level to the L level, the level of the signal from the NOT gate 123f (that is, the inverted signal of the signal S21R) is latched in the D flip-flop 123h and the Q output (the signal S27) is provided. When the signal S27 has the H level (that is, the lamp current IL is smaller than zero the moment that the signal VS2 falls to the L level) and the signal S21R has the H level when the signal VS2 has the L level (that is, the lamp IL is larger than zero when the signal VS2 has the L level), the signal S28 from the AND gate 123i has the H level.

An OR operation of the signals S26 and S28 is provided as the output signal (the phase difference signal) S23 from the phase difference detecting portion 123. More specifically, the output signal S23 has a pulse width corresponding to a phase difference between the signal S21R and the signal VS2 when the phase of the signal S21R is advanced with respect to the signal VS2. When the output signal S23 intermittently has the H level, it can be determined that the operating state of the series resonant circuit is the capacitive region. When the phase of the signal S21R is delayed from the signal VS2 (that is, the inductive region), the phase difference detecting portion 123 may generate the signal S23 having a pulse width corresponding to the phase difference between the signal S21R and the signal VS2. In this case, when the output signal S23 intermittently has the L level, it can be determined that the operating state of the series resonant circuit is the capacitive region.

Figure 13:
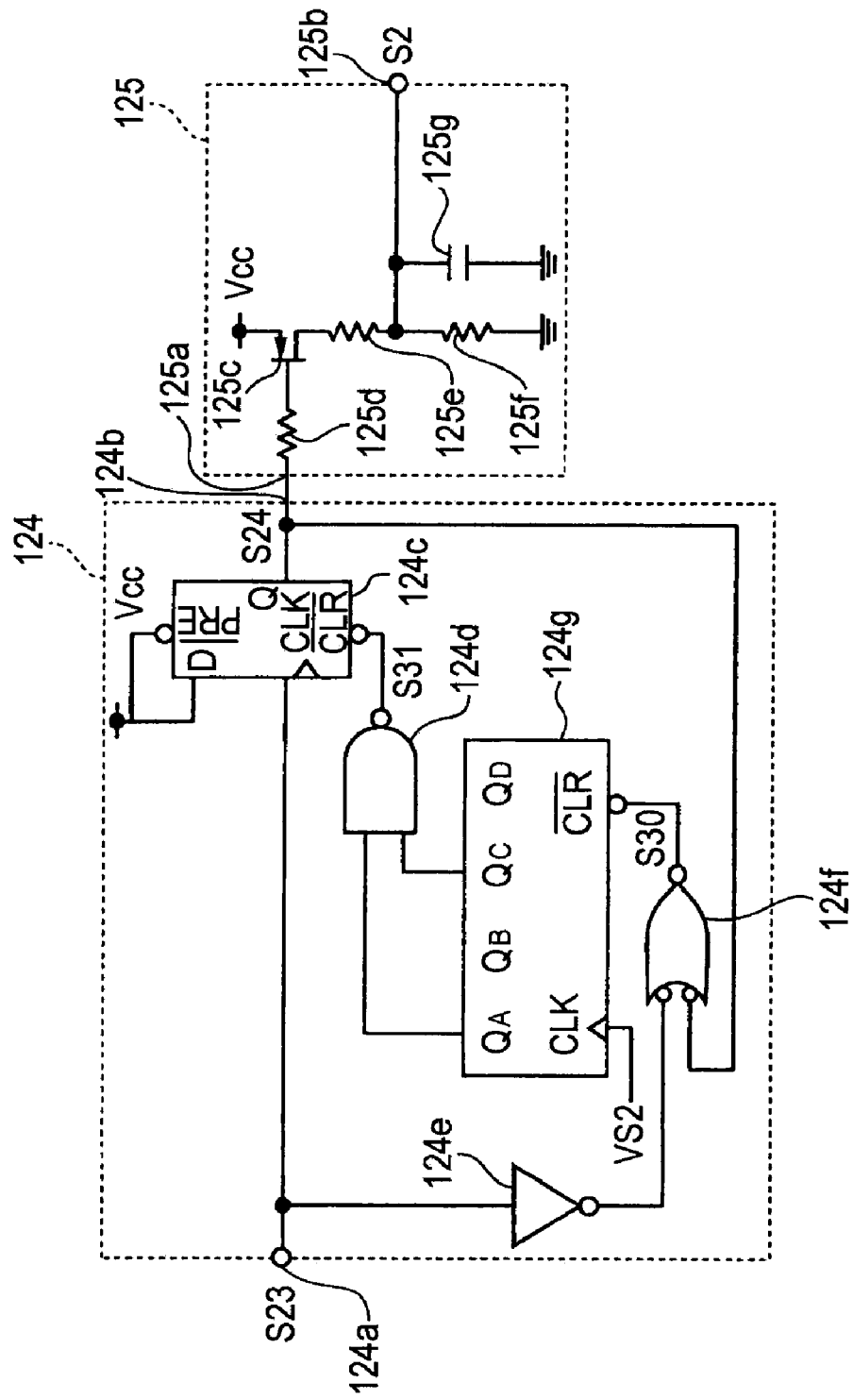
FIG. 13 is a circuit diagram showing a specific example of structures of a digital filter portion and a lowpass filter portion.

FIG. 13 is a circuit diagram showing a specific example of structures of the digital filter portion 124 and the lowpass filter portion 125. The digital filter portion 124 has a D flip-flop 124c, an NAND gate 124d, a NOT gate 124e, an AND gate 124f, and a counter 124g. A source voltage Vcc is input to a D terminal and a preset (PRE) terminal of the D flip-flop 124c, and the signal S23 is input from the phase difference detecting portion 123 to a clock (CLK) terminal through the input terminal 124a. A Q output of the D flip-flop 124c is provided as the signal S24 to the lowpass filter portion 125.

A Q output (the signal S24) of the D flip-flop 124c is provided to the AND gate 124f and the signal S23 is provided thereto through the NOT gate 124e. A signal S30 from the AND gate 124f is provided to a clear (CLR) terminal of the counter 124g. The signal VS2 is provided to a clock (CLK) terminal of the counter 124g. Both of the $Q_A$ and $Q_C$ outputs of the counter 124g are provided to the NAND gate 124d and a signal S31 from the NAND gate 124d is provided to the clear (CLR) terminal of the D flip-flop 124c. It is preferable to select an output of the counter 124g which is provided to the NAND gate 124d depending on the required counting time.

The lowpass filter portion 125 has a PNP type transistor 125c, resistors 125d to 125f, and a capacitor 125g. The signal S24 is provided from the input terminal 125a to a base terminal of the transistor 125c through the resistor 125d. A source voltage Vcc is provided to an emitter terminal of the transistor 125c and a collector terminal of the transistor 125c is connected to the output terminal 125b through the resistor 125e. Moreover, the output terminal 125b is connected to a ground potential line through the resistor 125f and the capacitor 125g which are connected in parallel with each other.

Figure 14:
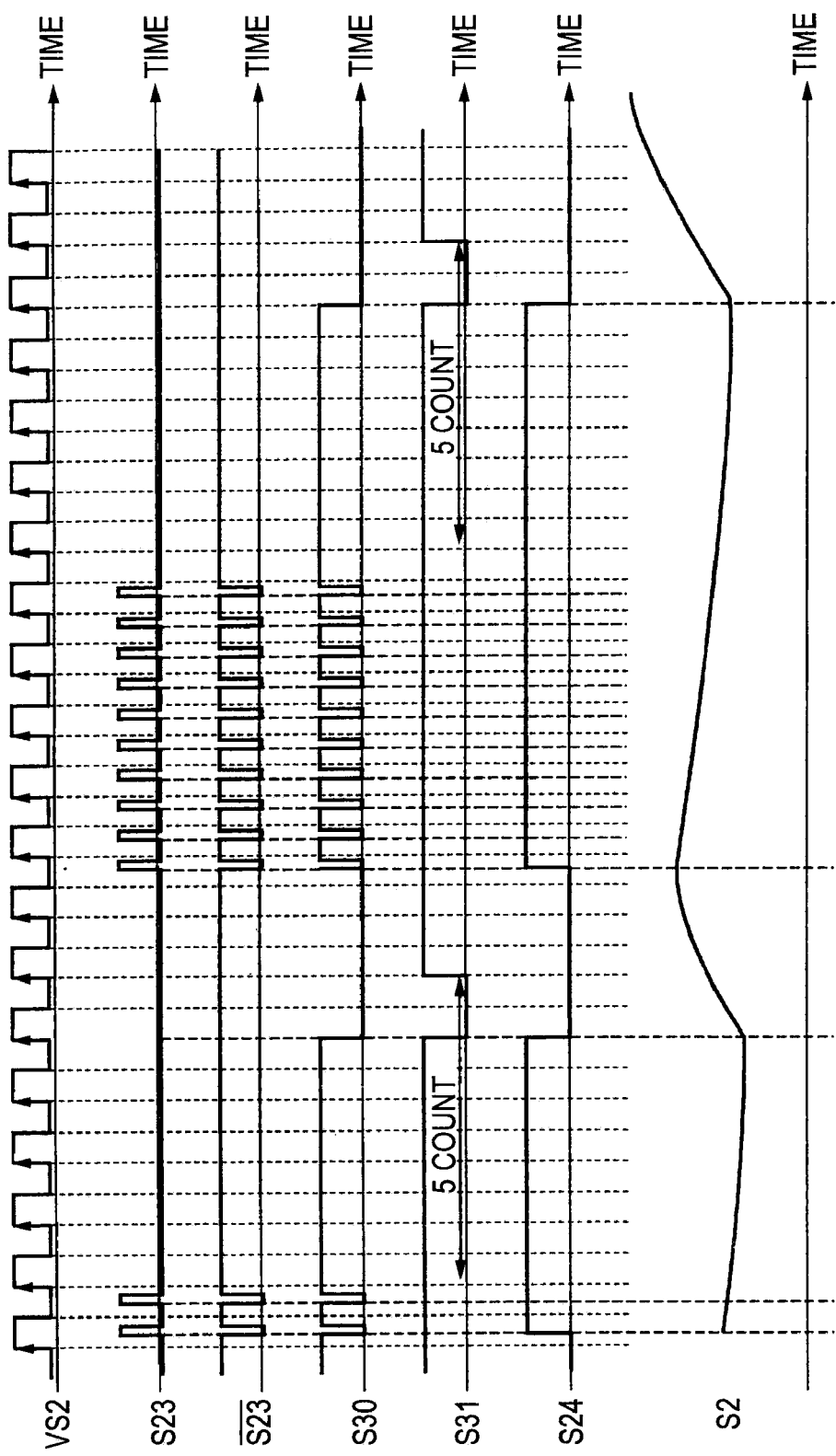
FIG. 14 is a timing chart showing each signal in the digital filter portion and the lowpass filter portion.

FIG. 14 is a timing chart showing each signal in the digital filter portion 124 and the lowpass filter portion 125. With reference to FIGS. 13 and 14, a description will be given to operations of the digital filter portion 124 and the lowpass filter portion 125.

First, when the signal S23 output from the phase difference detecting portion 123 rises from the L level to the H level, the Q output (the signal S24) of the D flip-flop 124c is latched to the H level. Consequently, the transistor 125c is brought into a non-conducting state. Consequently, a voltage value of the control signal S2 is gently reduced by a lowpass filter circuit constituted by the resistor 125f and the capacitor 125g. Accordingly, a voltage value of the control signal $Sc_1$ from the control portion 10 (see FIG. 4) is gently reduced so that the driving frequency of the series resonant circuit is slowly raised.

When the Q output (the signal S24) of the D flip-flop 124c is set to have the H level, the output signal S30 of the AND gate 124f rises from the L level to the H level and the counter 124g starts counting corresponding to a transition to the L level of the signal S23. The signal S23 carries out the transition to the L level and the NAND gate output signal S31 rises from the L level to the H level at a fifth count in the embodiment. Therefore, the D flip-flop 124c is reset and the Q output (the signal S24) of the D flip-flop 124c is held at the L level until the signal S23 is set to the H level again. Consequently, the transistor 125c is brought into a conducting state. Therefore, the voltage value of the control signal S2 is gently increased by a lowpass filter circuit constituted by the source voltage Vcc, the resistor 125e and the capacitor 125g. Accordingly, the voltage value of the control signal $Sc_1$ from the control portion 10 (see FIG. 4) is gently increased. Consequently, the driving frequency of the series resonant circuit is gently reduced.

As described above, it is indicated that the operating state of the series resonant circuit is the capacitive region when the output signal S23 sent from the phase difference detecting portion 123 is intermittently set to the H level. In this case, the voltage value of the control signal $Sc_1$ is reduced and the driving frequency is raised so that the phase difference between the voltage and the current in the series resonant circuit can be caused to approximate to zero (that is, the operating state of the series resonant circuit can be caused to approximate to a resonant state). On the other hand, when the signal S23 is maintained at the L level and is thus constant, the operating state of the series resonant circuit is the inductive region. In this case, the voltage value of the control signal $Sc_1$ is increased and the driving frequency is reduced so that the phase difference between the voltage and the current in the series resonant circuit can be caused to approximate to zero (to approximate to the resonant state).

Figure 15:
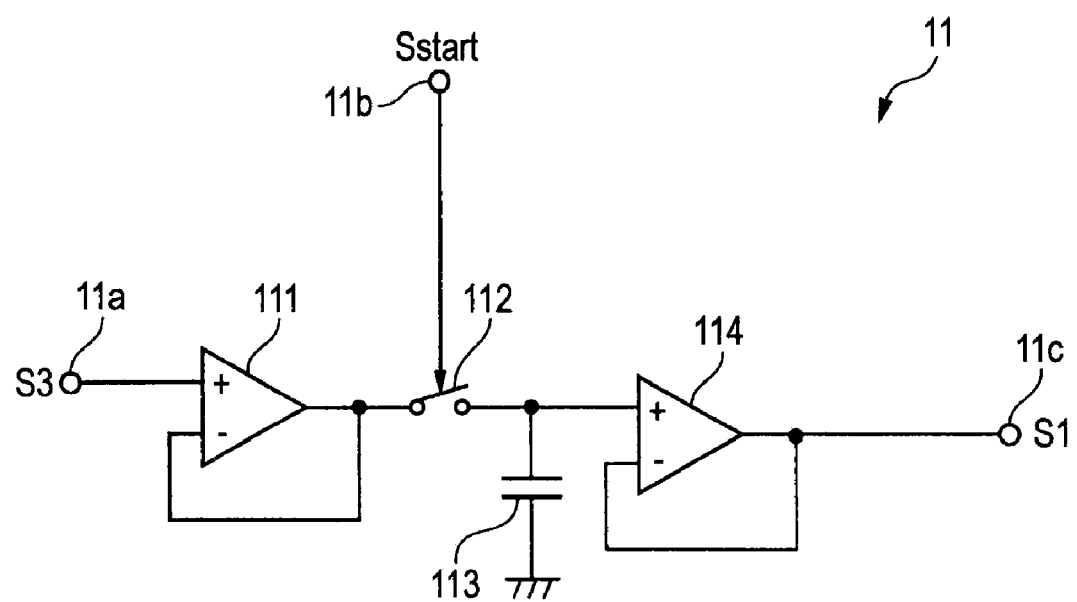
FIG. 15 is a circuit diagram showing an example of an internal structure of a sample hold portion 11.

FIG. 15 is a circuit diagram showing an example of an internal structure of the sample hold portion 11.

The sample hold portion 11 shown in FIG. 15 is composed of a buffer circuit 111, a switch 112, a capacitor 113 and a buffer circuit 114. A non-inverting input terminal of the buffer circuit 111 is connected to the input terminal 11a of the sample hold portion 11 and receives the control signal S3 from the power control portion 13. An output terminal of the buffer circuit 111 is connected to an inverting input terminal of the circuit 111 and is connected to one of the terminals of the switch 112. Moreover, one of the terminals of the capacitor 113 is connected to the other terminal of the switch 112 and a non-inverting input terminal of the buffer circuit 114, and the other terminal of the capacitor 113 is connected to a ground potential line. An output terminal of the buffer circuit 114 is connected to the output terminal 11c of the sample hold portion 11, and a signal output from the buffer circuit 114 is output as the control signal S1.

ON/OFF operation of the switch 112 is controlled by the pulse applying signal Sstart provided from the input terminal 11b of the sample hold portion 11. More specifically, the switch 112 is closed by setting the pulse applying signal Sstart to be a trigger so that the capacitor 113 holds an electric charge corresponding to the signal S3. Consequently, the value of the signal S3 is continuously output from the output terminal of the buffer circuit 114 in a timing in which a high voltage pulse is applied (the time $t_3$ shown in FIG. 8(a)).

A description will be given to various advantages that are present in some implementations of the discharge lamp lighting circuit 1 according to the illustrated embodiment. In the discharge lamp lighting circuit 1, as shown in FIG. 4, the control portion 10 comprises the sample hold portion 11 (the first circuit portion) for generating the constant control signal S1, the frequency follow-up control portion 12 (the second circuit portion) for generating the control signal S2 in such a manner that the phase difference between the signal VS2 in phase with the voltage of the series resonant circuit and the signal IS2 in phase with the current of the series resonant circuit approximates to zero, and the power control portion 13 (the third circuit portion) for generating the control signal S3 in such a manner that the magnitude of the supply power approximates a steady value in accordance with the predetermined time function (see FIG. 5). As shown in FIGS. 7 and 8, the control signal S1 sent from the sample hold portion 11 is selected after the first time $t_3$ that the high voltage pulse is applied from the starting portion 3, the control signal S3 from the power control portion 13 is selected after the third time $t_5$, and the control signal S2 from the frequency follow-up control portion 12 is selected and provided as the control signal $Sc_1$ from the control portion 10 from the second time $t_4$ to the time $t_5$.

The inventors thought that the high voltage pulse is applied from the starting portion 3 to turn ON the discharge lamp L and the discharge is then maintained continuously while a sufficient power for the discharge lamp L is supplied in the lighting control. They found that the series resonant frequency for giving the maximum value of the supply power is continuously changed from the low frequency $fon_1$ to the high frequency $fon_2$ as shown in FIG. 9 (that is, a correlation graph of the driving frequency and the supply power after the lighting operation is continuously moved from the graph G2 on the low frequency side to the graph G3 on the high frequency side).

In the discharge lamp lighting circuit 1, the frequency follow-up control portion 12 generates the control signal S2 in such a manner that the phase difference between the voltage and the current in the series resonant circuit is approximately zero. Therefore, it is possible to cause the driving frequency of the bridge driver 6 to follow the series resonant frequency of the series resonant circuit by the control signal S2. Accordingly, it is possible to continuously supply, to the discharge lamp L, a power having a close magnitude to a maximum power value changed every moment from the time $t_4$ to the time $t_5$ (from the operating points P3 to P4 in FIG. 9).

Also, the control signal S1 from the sample hold portion 11 is selected from the time $t_3$ to the time $t_4$ in which the high voltage pulse is applied. Before the operation of the frequency follow-up control portion 12 can be carried out, the driving frequency is held at a certain value in response to the control signal S1 from the sample hold portion 11 so that the arc of the discharge lamp L can be grown. Moreover, the control signal S3 from the power control portion 13 is selected after the time $t_5$ so that it is possible to suitably carry out a transition to a power control state in which a magnitude of an AC power is caused to approximate a steady value in accordance with a predetermined time function in a lighting control state.

The driving frequency of the bridge driver 6 can be controlled following a change in the series resonant frequency for giving the maximum value of the supply power. Therefore, it is not necessary to preset $\Delta f$ as shown in FIG. 15, and it is possible to control the driving frequency without depending on a fluctuation in a source voltage, a variation in an operating temperature and an error of an electrical characteristic of an electronic component and to maintain an excellent lighting property while causing a design of the component to have a large margin.

When a lighting characteristic (e.g., a lighting success ratio) is excellent, it is not necessary to repeat the lighting control many times and to quicken the start of the lighting. When the discharge lamp such as the vehicle headlamp is used, it is preferable that the lighting start should be as early as possible. According to the discharge lamp lighting circuit 1 it is possible to maintain the discharge while supplying a sufficient power for the discharge lamp L after applying the high voltage pulse and turning ON the discharge lamp L. Therefore, it is possible to enhance the lighting characteristic.

The frequency follow-up control portion 12 starts to output the control signal S2 after the time $t_4$. It is preferable that the time $t_4$ should be set after the arc of the discharge lamp L is grown and the lamp current IL is gradually increased, and the signal IS2 can be thus detected (more specifically, which is equal to the time that the phase of the current of the series resonant circuit can be detected or after the same time). In the case in which the phase of the current of the series resonant circuit is detected by using the lamp current IL as in the embodiment, it is impossible to detect the phase of the current of the series resonant circuit before the arc is started to be formed between the electrodes of the discharge lamp L. Therefore, it is preferable to grow the arc while holding the driving frequency to have a certain value by the sample hold portion 11 till the time $t_4$ that the lamp current IL can be detected and to cause the driving frequency to follow the series resonant frequency by the frequency follow-up control portion 12 after the arc is grown to some degree and the lamp current IL can be detected. Consequently, the control portion 10 according to the embodiment can be operated in an improved manner.

The discharge lamp lighting circuit according to the invention is not restricted to the illustrated embodiment, and other various modifications can be made. For example, while the diode OR circuit is employed in the selecting portion 14 of the control portion 10 in the embodiment, it is possible to apply circuits having other various structures which serve to select a control signal for maximizing the driving frequency.

Accordingly, other implementations are within the scope of the claims.

What is claimed is:

1. A discharge lamp lighting circuit for supplying, to a discharge lamp, an AC power to turn ON the discharge lamp, the lighting circuit comprising:
  a power supplying circuitry having a series resonant circuit including a plurality of switching units, at least one of an inductor or a transformer, and a capacitor, and a driving portion to drive the switching units and to convert a DC power and to supply the AC power to the discharge lamp;
  a control circuitry to generate a control signal to control a driving frequency of the driving portion; and
  a starting circuitry to apply a high voltage pulse to the discharge lamp to promote lighting,
  the control circuitry having:
    a first circuit portion to generate a constant control signal;
    a second circuit portion to generate a control signal so that a phase difference between a voltage and a current in the series resonant circuit is approximately zero; and
    a third circuit portion to generate a control signal so that a magnitude of the AC power approximates a steady value in accordance with a predetermined time function,
  wherein the lighting circuit is operable so that:
  the control signal from the first circuit portion is selected after a first time that the high voltage pulse is applied,
  the control signal from the third circuit portion is selected after a third time when a driving frequency based on the control signal from the third circuit portion exceeds a driving frequency based on the control signal from the second circuit portion, and
  the control signal from the second circuit portion is selected during a period from a second time, which is between the first time and the third time, to the third time.

2. The discharge lamp lighting circuit according to claim 1, wherein the second time is equal to or later than a time that a phase of the current of the series resonant circuit can be detected.

3. The discharge lamp lighting circuit according to claim 1, wherein the second circuit portion has a phase difference detecting portion to provide a first signal based on the voltage of the series resonant circuit and a second signal based on the current of the series resonant circuit,
  wherein the phase difference detecting portion is operable to generate a phase difference signal having a pulse width corresponding to a phase difference when a phase of the second signal is advanced or delayed with respect to the first signal, and
  the control circuitry is operable to change the driving frequency based on the phase difference signal.

* * * * *